United States Patent
Kuroda et al.

(10) Patent No.: US 8,148,285 B2
(45) Date of Patent: Apr. 3, 2012

(54) METHOD FOR MANUFACTURING ZEOLITE Y WITH ALUMINUM AND TITANIUM INSERTED THEREIN

(75) Inventors: Ryuzo Kuroda, Kitakyushu (JP); Masaru Ushio, Kawasaki (JP)

(73) Assignees: Petroleum Energy Center, Tokyo (JP); JGC Catalysts and Chemicals Ltd., Kanagawa (JP)

( * ) Notice: Subject to any disclaimer, the term of this patent is extended or adjusted under 35 U.S.C. 154(b) by 0 days.

(21) Appl. No.: 13/067,687

(22) Filed: Jun. 21, 2011

(65) Prior Publication Data

US 2011/0251049 A1    Oct. 13, 2011

Related U.S. Application Data

(63) Continuation of application No. 11/991,378, filed on Mar. 3, 2008, now abandoned.

(30) Foreign Application Priority Data

Sep. 12, 2005 (JP) ................................. 2005-264274

(51) Int. Cl.
*B01J 29/08* (2006.01)
*B01J 29/89* (2006.01)

(52) U.S. Cl. ............... 502/79; 502/86; 502/87; 502/439
(58) Field of Classification Search ............... 502/79, 502/86, 87, 439; 208/111.1
See application file for complete search history.

(56) References Cited

U.S. PATENT DOCUMENTS

| | | | | |
|---|---|---|---|---|
| 4,943,545 A | * | 7/1990 | Chang et al. | 502/26 |
| 5,098,687 A | * | 3/1992 | Skeels et al. | 423/715 |
| 5,601,798 A | * | 2/1997 | Cooper et al. | 423/700 |

* cited by examiner

*Primary Examiner* — Walter D Griffin
*Assistant Examiner* — Renee E Robinson
(74) *Attorney, Agent, or Firm* — Manabu Kanesaka (57) ABSTRACT

A catalytic composition for hydrotreating of hydrocarbons is made in which a metallic component for hydrogenation is carried on a carrier formed of zeolite Y with aluminum and titanium inserted therein and a porous inorganic oxide. The zeolite Y has: unit cell dimension in a range from 24.25 to 24.60 Å, crystallinity of 95% or more, specific surface area of 500 m$^2$/g or more, total pore volume of a group of pores each having a diameter of 600 Å or below in a range from 0.45 to 0.70 ml/g, pore volume of a group of pores each having a diameter in a range from 100 to 600 Å in a range from 0.10 to 0.40 ml/g, and pore volume of a group of pores each having a diameter in a range from 35 to 50 Å in a range 0.03 to 0.15 ml/g.

8 Claims, 3 Drawing Sheets

FIG. 5

METHOD FOR MANUFACTURING ZEOLITE Y WITH ALUMINUM AND TITANIUM INSERTED THEREIN

CROSS-REFERENCE TO RELATED APPLICATION

This is a continuation application of U.S. patent application Ser. No. 11/991,378, filed on Mar. 3, 2008, now abandoned.

TECHNICAL FIELD

The present invention relates to a method for manufacturing a zeolite Y with aluminum and titanium inserted therein. When used in hydrotreating of hydrocarbons such as a deasphalted oil (described as DAO hereinafter), the zeolite Y shows high hydrocracking capability for high boiling point fractions, high hydrogenating capability, excellent selectivity for middle fractions, and high desulfurizing and high denitrogenating capability. Furthermore the zeolite provides excellent effects such as a high gasoline yield and a low production rate of coke and hydrogen when the obtained uncracked bottom oil is used as a feed oil for catalytic cracking.

TECHNICAL BACKGROUND

Because the zeolite Y is a solid acid having acidity, the zeolite Y is used as solid acid catalyst in hydrotreating or in hydrocracking hydrocarbon oils. Especially in the hydrotreating of heavy hydrocarbon oils, ultra-stable zeolite Y (USY) having been subjected to de-aluminum processing is advantageously used. The USY has a unit cell dimension smaller than that of synthetic zeolite Y and also has a high $SiO_2/Al_2O_3$ molar ratio, and therefore the USY has high heat resistance. In addition, as for pore distribution, pore volume of pores in the range from 20 to 600 Å (mesopore volume) is larger than that of the synthetic zeolite Y.

The acidic characteristic of the zeolite Y varies according to the $SiO_2/Al_2O_3$ molar ratio, and since the ultra-stable zeolite Y (USY) having been subjected to de-aluminum processing has a high $SiO_2/Al_2O_3$ molar ratio, therefore the acidity of solid acid is strong, but the acid amount is small. Preferably the zeolite Y used for hydrotreating of hydrocarbon oils is required to have a large mesopore volume and a large amount of solid acid.

Japanese Patent Laid-Open Publication No. HEI 9-255326 (Patent document 1) discloses faujasite-type zeolite having two types of pores, homogeneous micropores and homogeneous mesopores and a method of producing the zeolite. The document describes that the zeolite has the mesopores suited to cracking of residual oils in addition to the micropores, and can advantageously be used for catalytically cracking residual oils. When the zeolite is used for hydrotreating of hydrocarbons, the effect of dispersing heavier hydrocarbons is not sufficient because pore volume of pores having the diameter larger than 50 Å is small, and therefore the further improvement has been desired.

Japanese Patent Laid-Open Publication No. 2002-255537 (Patent document 2) discloses novel zeolite having a large number of mesopores and providing excellent solid acid catalyst. The novel zeolite has the aluminum-silicon atomic ratio (Al/Si) in the range from 0.01 to 0.2, and volume percentage of mesopore volume of pores having the particle diameters in the range from 50 to 1000 Å in the range from 30 to 50%. Furthermore, in the zeolite, the mesopore volume is 0.14 cc/g or more, and a percentage of 4-coordinate aluminum atoms against the total aluminum atoms is 25% or more, which indicates that the zeolite has a large mesopore volume.

Patent document 2 discloses a method of producing novel zeolite including a step of immersing ultra-stable zeolite Y (USY) having a large mesopore volume as a feed material in an aqueous solution of sodium aluminate for reaction to insert aluminum atoms into the zeolite frame, and the conditions for reaction include a concentration of aluminum in the aqueous solution in the range from 0.03 to 0.1 mole/l, pH of the aqueous solution in the range from 11 to 12, the reaction temperature in the range from 10 to 40° C., and the reaction time in the range from 1 to 200 hours.

In the method, however, there is the problem that, because the feed USY is treated with an alkaline aqueous solution with the pH in the range from 11 to 12, crystallinity of the obtained zeolite is low. Because of the problem, when the zeolite is used for hydrotreating of hydrocarbons, an amount of a solid acid as a catalytically active point in the zeolite is small, and high cracking capability can not be obtained disadvantageously.

Japanese Patent Publication No. 3341011 (patent document 3) discloses a catalyst carrier made from zeolite in which ultra-fine particles of an oxide of a metal belonging to the titanium group are introduced in the mesopores for forming a complex and an atomic ratio of aluminum and silicon included in the zeolite (Al/Si) is in the range from 0.01 to 0.1, and catalyst in which a metal having the hydrogenating capability is carried on the catalyst carrier. Patent document 3 also discloses a method of preparing the catalyst carrier, and the method uses zeolite having mesopores as a feed material and includes the steps of contacting an aqueous solution of salt of titanium group to the zeolite at the pH of 0.8 to 2, washing the zeolite with water, drying the zeolite and then sintering the zeolite at a temperature in the range from 400 to 600° C.

In the catalyst carrier, however, ultra-fine particles of metallic oxide of the titanium group with a diameter in the range from 5 to 10 nm are present on inner surface of the mesopores of the zeolite, and furthermore 6-coordinate aluminum removed from the frame structure is present in the zeolite. Because of the features as described above, when the zeolite is used for hydrotreating of hydrocarbons, the heavy hydrocarbons are not sufficiently cracked, and the selectivity for middle fractions is disadvantageously low, and there is the need for overcoming the problems as described above.

DISCLOSURE OF THE INVENTION

A first object of the present invention is to solve the aforementioned problems and provide catalytic composition for hydrotreating of hydrocarbons by using aluminum- and titanium-inserted zeolite Y with specific characteristics and a method for hydrotreating thereof, in which the zeolite Y shows high hydrocracking capability for high boiling point fractions, high hydrogenating capability and high desulfurizing and high denitrogenating capability when used in hydrotreating of hydrocarbons such as DAO.

A second object of the present invention is to provide catalytic composition for hydrotreating of hydrocarbons by using aluminum- and titanium-inserted zeolite Y with specific characteristics and a method for hydrotreating thereof, in which the zeolite Y provides excellent effects such as a high gasoline yield and a low production rate of hydrogen and coke when the obtained uncracked bottom oil is used as a feed oil for catalytic cracking.

A third object of the present invention is to provide catalytic composition for hydrotreating of hydrocarbons by using aluminum- and titanium-inserted zeolite Y with specific characteristics and a method for hydrotreating thereof, in which the zeolite Y provides excellent effects such as high hydrocracking capability for high boiling point fractions, high hydrogenating capability, high desulfurizing and high denitrogenating capability, and a high yield of gasoline, kerosene or light oil fractions.

The inventors of the present invention have studied for achieving the aforementioned objects, and have found catalytic composition for hydrotreating of hydrocarbons by using aluminum- and titanium-inserted zeolite Y with specific characteristics of the improved acidic characteristics and pore structure, and the catalytic composition shows excellent effects for hydrotreating for hydrocarbon oils containing high boiling point fractions (high molecular hydrocarbons) such as deasphalted oil (DAO), and as a result the inventors have accomplished the present invention.

Firstly, the present invention relates to catalytic composition for hydrotreating of hydrocarbons in which a metal component for hydrogenation is carried on a carrier comprising of aluminum- and titanium-inserted zeolite Y with the following characteristics (a)-(g) and a porous inorganic oxide:
(a) unit cell dimension (UD) is in a range from 24.25 to 24.60 Å;
(b) crystallinity is 95% or more;
(c) specific surface area (SA) is 500 m2/g or more;
(d) total pore volume of a group of pores having a diameter of 600 Å or less (PVt) is in a range from 0.45 to 0.70 ml/g;
(e) pore volume of a group of pores having a diameter in a range from 100 to 600 Å (PVm) is in a range from 0.10 to 0.40 ml/g;
(f) pore volume of a group of pores having a diameter in a range from 35 to 50 Å (PVs) is in a range from 0.03 to 0.15 ml/g; and
(g) percentage of 4-coordinate aluminum atoms against total aluminum atoms in the zeolite is 60 atom % or more.

Secondary, the present invention relates to catalytic composition for hydrotreating of hydrocarbons in which the aluminum- and titanium-inserted zeolite Y has the following characteristics:
(h) a ratio of the pore volume of a group of pores having a diameter in a range from 100 to 600 Å (PVm), to the total pore volume of a group of pores having a diameter of 600 Å or less (PVt) (PVm/PVt) is 0.30 or more; and
(i) a ratio of the pore volume of a group of pores having a diameter in a range from 100 to 600 Å (PVm), to the pore volume of a group of pores having a diameter in a range from 35 to 50 Å (PVs) (PVm/PVs) is 2.5 or more.

A third invention of the present invention relates to a method for hydrotreating of hydrocarbons having high boiling point fractions by using the catalytic composition for hydrotreating of hydrocarbons.

(1) The aluminum- and titanium-inserted zeolite Y with specific characteristics included in the catalytic composition for hydrotreating of hydrocarbons in the present invention is the zeolite Y with de-aluminum processing which aluminum and titanium are inserted a frame thereof, and the aluminum and titanium inserted into the frame are supposed to be inserted into an outer surface of the frame of the zeolite Y. For that reason, the aluminum- and titanium-inserted zeolite Y has more solid acidic sites than the zeolite Y with de-aluminum processing, because more amounts of the aluminum and titanium exist in the outer surface of the frame.

(2) Since the aluminum- and titanium-inserted zeolite Y has large volumes of the total pore volume (PVt) and of the pore volume of pores having a diameter in the range from 100 to 600 Å (PVm), reactants such as high molecular hydrocarbons show better diffusion to solid acidic sites.

(3) For the aluminum- and titanium-inserted zeolite Y, since the aluminum and titanium inserted thereto are dispersed uniformly at the outer surface of pores, a hydrogen transfer reaction (bimolecular reaction) and an over-cracking reaction generating hydrogen and coke are hardly occurred.

(4) The catalytic composition for hydrotreating of hydrocarbons of the present invention shows excellent effects for high hydrocracking capability for high boiling point fractions, high hydrogenating capability and high desulfurizing and high denitrogenating capability by using for hydrotreating of hydrocarbon oils containing high boiling point fractions such as DAO.

(5) In addition, the high boiling point fractions of the obtained uncracked bottom oil are suitable for a feed oil for catalytic cracking because of a high yield of gasoline, kerosene or light oil fractions, and a low production rate of hydrogen and coke when they are used as a feed oil for catalytic cracking.

DETAILED DESCRIPTION OF THE INVENTION

Zeolite Y with Aluminum and Titanium Inserted Therein

Aluminum and titanium-inserted zeolite Y as used herein means zeolite Y with aluminum and titanium inserted in a frame structure of the zeolite Y having been subjected to processing for removing aluminum. Description is provided below for the aluminum and titanium-inserted zeolite Y according to the present invention.

(a) Unit Cell Dimension (UD)

The unit cell dimension (UD) of the aluminum and titanium-inserted zeolite Y is in the range from 24.25 to 24.60 Å. The zeolite Y with the unit cell dimension (UD) less than 24.25 Å has a high SiO2/Al2O3 molar ratio in the frame structure and includes only a small amount of a solid acid which is an activation point of cracking of hydrocarbons, and therefore the cracking activity of a catalytic composition for hydrotreating including the zeolite tends to decline during use. The zeolite Y with the unit cell dimension (UD) more than 24.60 Å has low heat resistance, and a frame structure of zeolite is broken during hydrotreating, and the cracking activity of the catalytic composition for hydrotreating including the zeolite declines. The unit cell dimension (UD) of the aluminum and titanium-inserted zeolite Y according to the present invention is preferably in the range from 24.30 to 24.50 Å.

(b) Crystallinity

Crystallinity in the zeolite Y described above is required to be 95% or more. When the crystallinity is lower than 95%, the catalytic composition for hydrotreating including the zeolite Y does not provide desired effects. The crystallinity of the zeolite Y is preferably in the range from 100 to 150%. The crystallinity is calculated through the following equation:

$$Crystallinity = H/H0 \times 100(\%),$$

where H is a total peak height on each of the (331), (511), (440), (533), (642) and (555) planes for X-ray diffraction of the zeolite Y above, and H0 is a peak height for each of the same planes for X-ray diffraction of zeolite Y procurable from the market (produced by Union Carbide; SK-40). The calculation is based on the assumption that the crystallinity of the zeolite Y procurable from the market is 100.

(c) Specific Surface Area (SA)

A specific surface area of the zeolite Y described above (when measured by means of the BET method of nitrogen adsorption) is 500 m2/g or more. When the specific surface area (SA) is less than 500 m2/g, the solid acid sites effective for the hydrotreating reaction can not be obtained, and the catalytic composition for hydrotreating including the zeolite can not provide the desired effects. A specific surface area (SA) of the zeolite is preferably in the range from 550 to 800 m2/g.

(d) Total Pore Volume (PVt) of a Group of Pores Each Having a Diameter of 600 Å or Less A total pore volume (PVt) of a group of pores each having a diameter of 600 Å or less is in the range from 0.45 to 0.70 ml/g. When the total pore volume (PVt) is smaller than 0.45 ml/g, the catalytic composition for hydrotreating including the zeolite can not provide the desired effects. When the total pore volume (PVt) is lager than 0.70 ml/g, sometimes a crystallinity of the zeolite may decrease. The total pore volume (PVt) is preferably in the range from 0.50 to 0.65 ml/g.

In the present invention, the total pore volume (PVt) of pores each having a diameter in the range described above was obtained from a pore distribution obtained by calculating and analyzing data for adsorption and desorption of nitrogen by means of the B.J.H method.

(e) Pore Volume (PVm) of a Group of Pores Each Having a Diameter in the Range from 100 to 600 Å

A pore volume (PVm) of a group of pores each having a diameter in the range from 100 to 600 Å is in the range from 0.10 to 0.40 ml/g. When the pore volume (PVm) is smaller than 0.10 ml/g, the effect of diffusing hydrocarbons having high molecular weights is not sufficient, and the catalytic composition for hydrotreating of hydrocarbons including the zeolite can not sufficiently crack high molecular weight hydrocarbons such as DAO. When the pore volume (PVm) is more than 0.40 ml/g, a crystallinity of the zeolite may disadvantageously decrease, and sometimes the catalytic compositions for hydrotreating of hydrocarbons using the zeolite can not provide the desired effects. The pore volume (PVm) is preferably in the range from 0.15 to 0.35 ml/g.

(f) Pore Volume (PVs) of a Group of Pores Each Having a Diameter in the Range from 35 to 50 Å

The pore volume (PVs) of a group of pores each having a diameter in the range from 35 to 50 Å is in the range from 0.03 to 0.15 ml/g. When the pore volume (PVs) is smaller than 0.03 ml/g, the selectivity for gasoline or kerosene and light oil fractions in the sequentially cracking reaction for high molecular weight hydrocarbons tends to decrease. When the pore volume (PVs) is larger than 0.15 ml/g, the sequentially cracking reaction proceeds, which will leads to increase in volumes of gases and cokes produced in the reaction. The pore volume (PVs) is preferably in the range from 0.05 to 0.10 ml/g.

(g) Percentage of 4-Coordinate Aluminum Atoms Against Total Aluminum Atoms in the Zeolite An aluminum atom constituting a frame structure of zeolite Y is a 4-coordinate atom, while an aluminum atom outside the frame structure of the zeolite Y is a 6-coordinate one.

In the catalytic composition for hydrotreating of hydrocarbons according to the present invention, a percentage of 4-coordinate aluminum atoms against total aluminum atoms (4-coordinate aluminum atoms and 6-coordinate aluminum atoms) in the zeolite Y with aluminum and titanium inserted therein is required to be 60 atomic percent or more. When the percentage of 4-coordinate aluminum atoms is smaller than 60 atomic percent, an amount of aluminum inserted into a frame structure of the zeolite Y, the catalytic composition for hydrotreating of hydrocarbons including the zeolite can not provide the desired effect, for instance, in the cracking capability of high-boiling point fractions such as DAO. It is guessed that aluminum is mainly inserted onto an external surface frame structure of the zeolite, and an amount of solid acid sites on an outer surface of the zeolite is large, and it is expected that the solid acid sites will contribute to hydrogenating capability of high molecular weight hydrocarbons such as DAO.

The percentage of 4-coordinate aluminum atoms against total aluminum atoms in the zeolite with aluminum and titanium inserted therein is preferably 70 atomic percent or more. The percentage of 4-coordinate aluminum in the zeolite was obtained from the 27Al MAS NMR spectrum measured by the nuclear magnetic resonance instrument (NMR) VXR-400 produced by VARIAN Corp.

An amount of titania (TiO2) included in the zeolite Y with aluminum and titanium inserted therein is preferably in the range from 0.5 to 15 weight %. When the amount of titania (TiO2) is smaller than 0.5 weight %, a yield of gasoline, kerosene or light oil may decrease. When the amount of titania (TiO2) is larger than 15 weight %, the cracking activity may decrease. The amount of titania (TiO2) is preferably in the range from 1 to 10 weight %. The amount of titania (TiO2) in the zeolite is measured with a fluorescent X-ray analyzer.

The zeolite Y with aluminum and titanium inserted therein according to the present invention should preferably have the characteristics (h) and (i) described below in addition to those described above.

(h) (PVm/PVt) Ratio

In the zeolite Y with aluminum and titanium inserted therein according to the present invention, a ratio of the pore volume (PVm) of a group of pores each having a diameter in the range from 100 to 600 Å, to the total pore volume (PVt) of a group of pores each having a diameter of 600 Å or less should preferably be 0.30 or more. When the (PVm/PVt) ratio is smaller than 0.30, high molecular weight hydrocarbons are not dispersed well, and sometimes the cracking capability of the catalytic composition for hydrotreating of hydrocarbons using the zeolite may decrease. The (PVm/PVt) ratio should more preferably be in the range from 0.30 to 0.50.

(i) (PVm/PVs) Ratio

The ratio (PVm/PVs) of the pore volume (PVm) of a group of pores each having a diameter in the range from 100 to 600 Å, to the pore volume (PVs) of a group of pores each having a diameter in the range from 35 to 50 Å is preferably 2.5 or more. When the ratio (PVm/PVs) is smaller than 2.5, the cracking capability for high boiling point fractions such as DAO decrease, and sometimes amounts of produced gases and cokes may increase. The ratio (PVm/PVs) is more preferably in the range from 2.5 to 4.5.

Preparation of Zeolite Y with Aluminum and Titanium Inserted Therein

The zeolite Y with aluminum and titanium inserted therein described above is prepared as described below.

After NaY-type of synthetic zeolite is ion-exchanged with ammonium ion, the zeolite is heated in a steam atmosphere to prepare an ultra-stable zeolite Y (USY) with the unit cell dimension (UD) in the range from 24.25 to 24.60 Å. Then, the USY is processed with an acidic aqueous solution containing titanium such as an aqueous solution of titanyl sulfate at pH 1.5 or below. Furthermore, the USY is filtered, washed, and dried to prepare the zeolite with aluminum removed from the frame structure and also with titanium inserted to the frame structure (Al-removed and titanium-inserted zeolite Y).

Then the titanium-inserted zeolite Y is suspended in an acidic aqueous solution or a neutral aqueous solution such materials as sulfuric acid, ammonium sulfate, and ammonium acetate with the pH preferably in the range from 4 to 7 and the suspension is heated at a temperature in the range from 100 to 200° C. for 3 to 30 hours. Then the suspension is filtered, washed, and dried to obtain aluminum removed from the suspension, and a portion of the recovered aluminum is re-inserted into a frame structure of the zeolite to prepare the zeolite Y with aluminum and titanium inserted therein.

In this preparation method, the zeolite Y with aluminum removed and with titanium inserted is suspended in the acidic or neutral aqueous solution, so that a reduction of crystallinity never occurs in the USY. Furthermore the zeolite is heated at the temperature in the range from 100 to 200° C. for 3 to 30 hours, so that the removed aluminum out of the frame structure of the zeolite can easily be re-inserted into the zeolite frame, and the zeolite Y having the porous structure can be obtained.

In another method of preparing the zeolite Y with aluminum and titanium inserted therein described above, the USY prepared by the method described above is suspended in an acidic or neutral aqueous solution of such materials as sulfuric acid, ammonium sulfate, or ammonium acetate with the pH preferably in the range from 4 to 7 is suspended, and the suspension is heated at a temperature from 100 to 200° C. for 3 to 30 minutes. Then the suspension is filtered and washed, and a portion of aluminum removed from the zeolite Y is again inserted into the frame structure of the zeolite. Then the aluminum-inserted zeolite Y is processed with a titanium containing aqueous solution such as an aqueous solution of titanium lactate or an aqueous solution of titanyl sulfate, and the zeolite is filtered, washed, and dried to obtain the zeolite Y with aluminum and titanium inserted therein.

Catalytic Composition for Hydrotreating

As porous inorganic oxides comprising the catalytic composition for hydrotreating according to the present invention, those generally used for preparing a catalytic composition for hydrotreating or for hydrocracking may be used. The porous inorganic compositions available in the present invention include alumina, silica, titania, silica-alumina, alumina-titania, alumina-zirconia, alumina-boria, phosphor-alumina, silica-alumina-boria, phosphor-alumina-boria, phosphor-alumina-silica, silica-alumina-titania, and silica-alumina-zirconia. Especially, a porous and inorganic oxide including alumina as a main component can advantageously be used for carrying out the present invention.

Any known metallic component used in the hydrotreating can be used as a metallic component of a catalytic composition for hydrotreating according to the present invention, and there can be enlisted, for instance, metals belonging to Group 8 and/or Group 6A in the periodic table. The preferable metallic components include combinations of molybdenum or tungsten belonging to Group 6A and a cobalt or nickel belonging to Group 8, or metals belonging to Platinum Group.

In the catalytic composition for hydrotreating according to the present invention, a content of the zeolite Y with aluminum and titanium inserted therein can be changed according to the necessity. Generally, the content is preferably in the range from 2 to 80 weight % (namely a content of the porous inorganic oxide in the range from 98 to 20 weight %), more preferably in the range from 20 to 70 weight % (namely a content of the porous inorganic oxide in the range from 80 to 30 weight %) when calculated as a weight of the carrier (a combination of the zeolite Y with aluminum and titanium inserted therein and the porous inorganic oxide).

An amount of metallic components in a catalytic composition for hydrotreating according to the present invention may be the same as that in the ordinary composition for hydrotreating. The content as calculated as oxide of molybdenum, tungsten, cobalt, nickel or the like is in the range from 5 to 30 weight %, and when calculated as a content of a metal belonging to Platinum Group is in the range from 0.01 to 2 weight %.

Production of the Catalytic Composition for Hydrotreating

The catalytic composition for hydrotreating of hydrocarbons according to the present invention is produced, for instance, by mixing the zeolite Y with aluminum and titanium inserted therein described above with a precursor of a porous inorganic oxide, molding the mixture to a desired form by means of any known method, drying and sintering to produce the carrier, impregnating metallic components for hydrogenation by any known method, and drying and sintering the metal-impregnated carrier. Alternatively the catalytic composition for hydrotreating according to the present invention is produced by mixing metallic components for hydrogenation into a combination of the zeolite Y with aluminum and titanium inserted therein and a precursor of a porous inorganic oxide, molding the mixture to a desired form, and then drying and sintering the mixture.

The precursor for porous inorganic oxide as used herein indicates any material that can be used to prepare a porous inorganic oxide comprising the catalytic composition for hydrotreating by being mixed with other component for hydrotreating.

The conditions conventionally employed for sintering this type of catalytic composition for hydrotreating can be applied when sintering the carrier and the catalytic composition for hydrotreating according to the present invention, and a temperature for sintering is preferably in the range from 400 to 650° C.

Hydrotreating of Hydrocarbons

The catalytic composition for hydrotreating of hydrocarbons according to the present invention can be used for hydrotreating of any hydrocarbon oil, and especially can advantageously be used for hydrotreating of a hydrocarbon containing high boiling point fractions. The term of "high boiling point fraction" as used herein indicates a hydrocarbon containing fractions, which can be obtained at a boiling point of 560° C. or more (560° C.+) by 30 weight % or more.

The ordinary conditions for hydrotreating may be employed also in the present invention, and the conditions include a temperature in the range from 300 to 500° C., a hydrogen pressure in the range from 4 to 30 MPa, a liquid space velocity in the range from 0.1 to 10 hr−1.

EXAMPLES

Examples are provided below to describe the present invention further specifically, however, the present invention is not limited to the examples in any way.

Example for Reference 1 (Preparation of USY-5)

Figure 1:
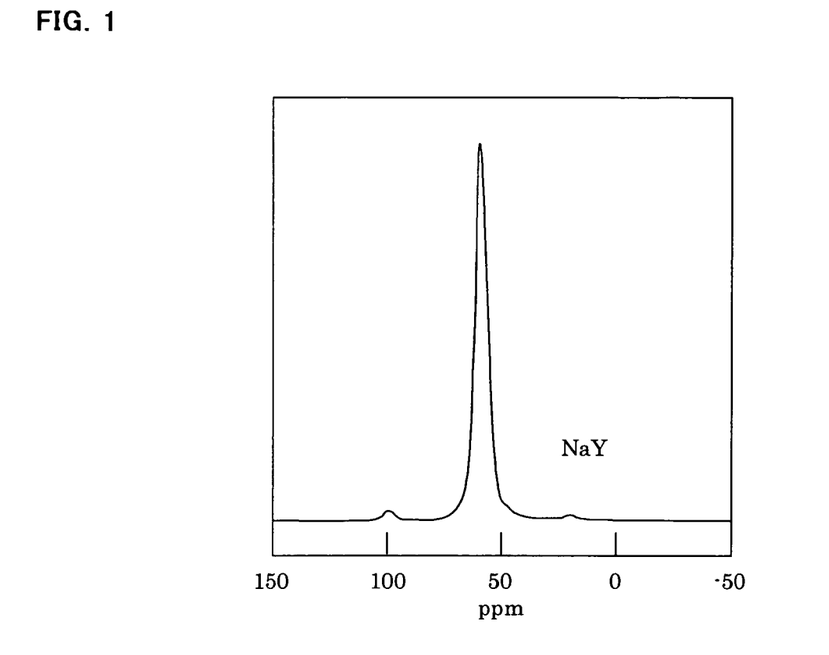
FIG. 1 is a view showing an 27Al MAS NMR spectrum of the Na-zeolite Y (Na—Y)

9.0 Kg of NaY-type zeolite (Na—Y) having the characteristics as shown in Table 3 and showing the 27Al MAS NMR spectrum as shown in FIG. 1 was suspended in 90 litters of warm water at a temperature of 60° C. 2.56 Kg of ammonium sulfate, which was equivalent in the mole number, was added to the zeolite, and was ion-exchanged at a temperature of 70° C. for one hour with agitation.

Then the mixture was filtered, washed, and was again ion-exchanged with a solution prepared by dissolving 2.56 Kg of ammonium sulfate in 20 litters of warm water at the temperature of 60° C., and was filtered and washed with 90 litters of deionized water at a temperature of 60° C. Then the mixture was dried at a temperature of 130° C. for 20 hours, and was pulverized to obtain NH4-Y type zeolite (NH465Y) ion-exchanged by 65%.

Then the zeolite Y (NH465Y) was sintered for one hour in saturated steam atmosphere at a temperature of 660° C. in a rotary steaming device to obtain H—Y type zeolite (HY-5). This zeolite HY-5 was suspended in 90 litters of warm water at 60° C. Then 7.92 Kg of ammonium sulfate, which was equivalent of 3 mole times of the zeolite, was added to the solution, and the mixture solution was agitated for one hour at a temperature of 90° C. for ion-exchanging, filtered, and the filtrate was washed with 90 litters of deionized water at 60° C. Then the filtrate was dried for 20 hours at a temperature of 130° C., and was pulverized to obtain the zeolite Y (NH485Y) ion-exchanged by 85%. The zeolite NH485Y was sintered in saturated steam atmosphere for one hour at a temperature of 700° C. in a rotary steaming device to obtain about 8 Kg of ultra-stable zeolite Y (USY-5).

Example for Reference 2 (Preparation of USY-12)

8.0 kg of the USY-5 prepared in Example for reference 1 was suspended in 80 litters of warm water at 60° C., and 13.64 kg sulfuric acid with the concentration of 25 weight % was gradually added in the suspension. The mixture suspension was agitated for one hour at a temperature of 70° C. and aluminum outside the frame structure was dissolved therein. Then the suspension was filtered and the filtrate was washed with 80 litters of deionized water at a temperature of 60° C. and was dried for 20 hours at 130° C. to obtain about 6.4 Kg of ultra-stable zeolite Y (USY-12).

Figure 2:
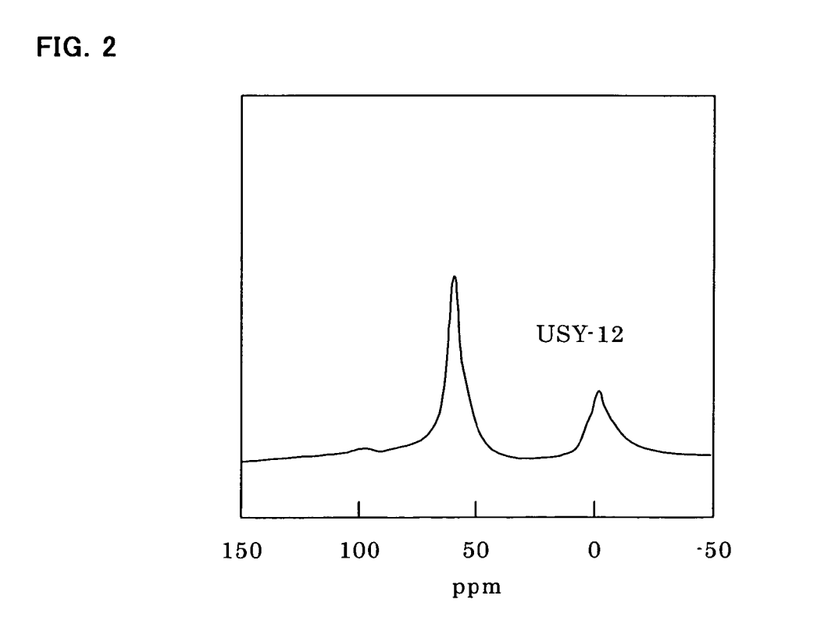
FIG. 2 is a view showing an 27Al MAS NMR spectrum of the ultra-stable zeolite Y (USY-12)

Characteristics of the USY-12 are shown in Table 3, and the 27Al MAS NMR spectrum was shown in FIG. 2. In FIG. 2, the peak at 60 ppm shows the presence of a zeolite frame-structured 4-coordinate aluminum atom, while a peak at 0 ppm indicates the presence of a 6-coordinate aluminum atom outside the zeolite frame structure.

Example for Reference 3 (Preparation of Ti.USY-12AC)

4.0 Kg of the USY-12 prepared in Example for reference 2 was suspended in 40 litters of deionized water at a temperature of 25° C., and 4.19 Kg of sulfuric acid with the concentration of 25 weight % and 0.33 Kg of titanyl sulfate with the concentration of 33 weight % as calculated as that of TiO2 were gradually added to the suspension. The mixture solution was agitated for 4 hours at a temperature of 25-30° C. to insert titanium into a frame structure of the zeolite, and aluminum outside the frame structure was dissolved.

The suspension was filtered and the filtrate was washed with 40 litters of deionized water at a temperature of 30° C. or below and was dried for 20 hours at 130° C. to obtain about 3.2 Kg of zeolite Y with titanium inserted therein (Ti.USY-12). The Ti.USY-12 shows a peak of the 27Al MAS NMR spectrum at 0 ppm, which indicates the presence of 6-coordinate aluminum atom outside the frame structure of the zeolite.

Then 0.50 Kg of the zeolite Y with titanium inserted therein (Ti.USY-12) and 0.32 Kg of ammonium sulfate were added to 3.50 Kg of water. pH of the suspension was 5.1. The suspension was set in a 5-litter autoclave and was agitated for 16 hours at 150° C. Then the suspension was filtered and the filtrate was washed with 10 litters of deionized water at 60° C. and dried for 20 hours at 130° C. to prepared about 0.45 Kg of zeolite Y with aluminum and titanium inserted therein. The operations above were repeated 3 times to prepare about 1.3 Kg of zeolite Y with aluminum and titanium inserted therein (Ti.USY-12AC).

Figure 3:
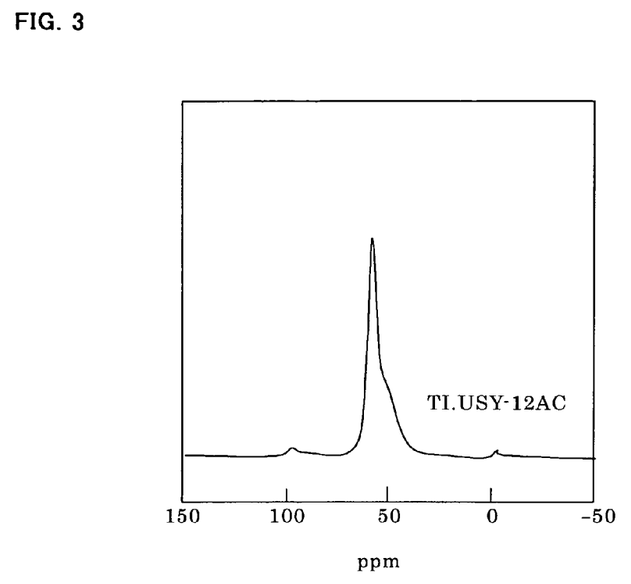
FIG. 3 is a view showing 27Al MAS NMR spectrums of the aluminum- and titanium-inserted zeolite Y (Ti.USY-12AC)

Characteristics of the zeolite Ti.USY-12AC is shown in Table 3, and the 27Al MAS NMR spectrum is shown in FIG. 3.

As can be seen from FIG. 3, in the Ti.USY-12AC, the peak for 6-coordinate aluminum (at 0 ppm) indicating the presence of aluminum outside the zeolite frame structure decrease as compared to the USY-12, and the peak for 4-coordinate aluminum (at 60 ppm) indicating the presence of aluminum atoms in the zeolite frame structure increase, which indicates that aluminum outside the zeolite frame structure was inserted into the frame of the zeolite Y in the Ti.USY-12AC.

Figure 4:
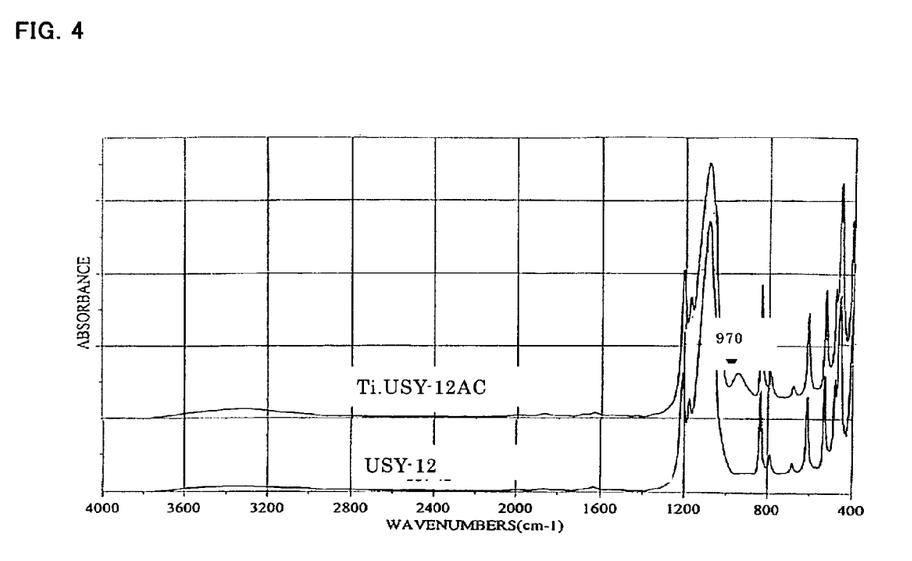
FIG. 4 is a view showing IR spectrums of the USY-12 and Ti. USY-12AC.

IR spectrums for the USY-12 and Ti.USY-12AC are shown in FIG. 4. A peak caused by Si—O—Ti asymmetric stretching vibration appear at 970 cm−1 in the MFI type titanosilicate and at 945 cm−1 in the HY type zeolite in proportion to an amount of introduced TiO2. The peak at about 970 cm−1 was not confirmed in the USY-12, but the peak was clearly confirmed in the Ti.USY-12AC. From this case, it can be determined that titanium was inserted into the frame structure of the zeolite Y.

Example for Reference 4 (Preparation of USY-12ACTi)

About 6.4 Kg of the ultra-stable zeolite Y (USY-12) having the same characteristics as those of the ultra-stable zeolite Y (USY-12) prepared in Example for reference 2 was obtained by carrying out the same operations as those in Example for reference 1 and Example for reference 2. Then 3.0 Kg of the zeolite (USY-12) and 1.92 Kg of ammonium sulfate were added to 21 litters of water. pH of the suspension was 5.1. The suspension was set in a 30-litter autoclave and was agitated for 16 hours at 150° C. Then the suspension was filtered and the filtrate was washed with 30 litters of deionized water at a 60° C. and dried for 20 hours at 130° C. to prepare about 3 Kg of aluminum-inserted zeolite Y (USY-12AC).

2.0 Kg of the USY-12AC was suspended in 40 litters of deionized water at 25° C., and a mixture solution of 4.19 Kg of sulfuric acid with the concentration of 25 weight % and 1.36 Kg of titanium lactate (TiC6H10O7, produced by Matsumoto Seiyaku Kogyo; Orgatics TC-310) with the concentration of 8 weight % calculated as TiO2 was gradually added, and the resultant suspension was agitated for 4 hours at a temperature of 30° C. or below to insert titanium into a frame structure of the zeolite and also dissolve aluminum outside the frame structure.

Then the suspension was filtered, and the filtrate was washed with 40 litters of deionized water at a temperature of 30° C. or below and was dried for 20 hours at 130° C. to prepare about 2 Kg of zeolite Y with aluminum and titanium inserted therein (USY-12ACTi).

Figure 5:
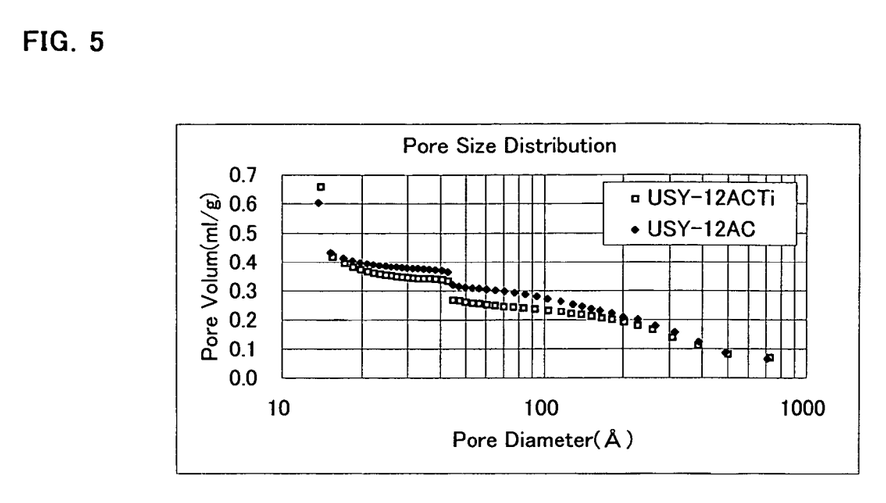
FIG. 5 is a view showing pore distributions in the USY-12AC and USY-12ACTi.

Characteristics of the USY-12ACTi are shown in Table 3, and pore distribution of the USY-12ACTi is shown in FIG. 5. The IR spectrum of the zeolite (USY-12ACTi) was measured, and a peak of about 970 cm−1 was identified like in Example for reference 3 to indicate that titanium was inserted into a frame structure of the zeolite Y.

Example for Reference 5 (Preparation of USY-12NaAlO2)

2 Kg of the USY-12 prepared in Example for reference 4 and 1.64 Kg of sodium aluminate with the concentration of 22 weight % calculated as that of Al2O3 were suspended in 20 litters of deionized water. pH of this suspension was 11.2. The suspension was agitated for 90 hours at 15° C. The suspension was filtered, and the filtrate was ion-exchanged with 20 litters of deionized water having the temperature of 60° C. with 3 Kg of ammonium sulfate dissolved therein. Again the filtrate was washed with 20 litters of deionized water at 60° C. and was dried for 20 hours at 130° C. to prepare about 2 Kg of zeolite Y processed by sodium aluminate (USY-12NaAlO2). Characteristics of the zeolite are as shown in Table 3.

Comparative Example 1

Preparation of Catalyst A 12.88 Kg of aqueous solution of sodium aluminate with the concentration of 22 weight % calculated as a concentration of Al2O3 was set in a 100-L tank with a steam jacket, and diluted with ion-exchanged water to adjust the weight to 40 Kg. 0.22 Kg of sodium gluconate with the concentration of 26 weight % was added in the solution, and the resultant mixture solution was agitated and heated to 60° C. 13.86 Kg of aluminum sulfate aqueous solution with the concentration of 7 weight % calculated as Al2O3 concentration was added in a 50-litter container, and was diluted with warm water at 60° C. to adjust the weight to 40 Kg. The aluminum sulfate solution was added at a constant rate with a rotary pump in the sodium aluminate solution to adjust the pH from 7.1 to 7.3 over 10 minutes. The obtained suspended slurry was agitated and aged for 1 hour at 60° C.

The aged slurry was dehydrated with a flat plate filter, and the filtrate was washed with 150 litters of ammonia aqueous solution with the concentration of 0.3 weight %. The cake-like slurry after washing was diluted with ion-exchanged water to adjust the concentration to 10 weight % calculated as a concentration of Al2O3. Then pH of the slurry was adjusted to 10.5 with ammonia water with the concentration of 15 weight %. The slurry was removed into an aging tank with a circulator and was aged for 10 hours under agitation at 95° C. After cooling, the slurry was dehydrated with a flat plate filter, and was set in a double-armed kneader with a steam jacket to adjust a content of water to a prespecified value and then cooled to prepare an adulterant of aluminum.

1.0 Kg of the aluminum adulterant calculated as a weight of Al2O3 and 1.0 Kg of ultra-stable zeolite Y (USY-12) prepared in Example for reference 2 were set and kneaded at a raised temperature in a double-armed kneader with a steam jacket to adjust the water content to a prespecified value. Then the adulterant was cooled and further kneaded for 10 minutes. The obtained adulterant was molded to column-like pellets with a diameter of 1.8 mm with an extrusion molding machine, and the product was dried at 110° C. for 16 hours. The dried pellets were sintered for 3 hours at 550° C. in an electric oven to prepare a carrier.

201.3 g of molybdenum trioxide and 90.4 g of nickel carbonate were set in a 1-litter container, and then 700 ml of ion-exchanged water were added, and the mixture was agitated and suspended. The suspended solution was aged for 5 hours at 95° C. with circulation to prevent the solution decreasing. Then 141 g of citric acid was added for dissolving the suspended materials to obtain a homogeneous solution for impregnation.

The solution was impregnated in the carrier described above. Impregnation was performed by setting 1000 g of the carrier in a rotary blender capable of being vacuum-deaerated and left there for 5 minutes being deaerated with a vacuum pump. A quantity of the prepared solution for impregnation was adjusted to match a water absorption coefficient of the carrier. Operation of the vacuum pump was added after the solution was added, and then was further rotated for 20 minutes so that the solution for impregnation was fully impregnated in the carrier. The impregnated sample was taken out and set in a rotary drier with a temperature rising program, and the temperature was changed from 40° C. to 250° C. over 1 hour for drying the sample. The dried sample was set in an electric oven and was sintered for 1 hour at 550° C. to obtain a catalyst A. Characteristics of the catalyst A is as shown in Table 4.

Example 1

Preparation of Catalyst B 1.0 Kg of aluminum adulterant prepared in Comparative Example 1 calculated as a weight of Al2O3 and 1.0 Kg of zeolite Y with aluminum and titanium inserted therein (Ti.USY-12AC) prepared in Example for reference 3 were kneaded and heated in a double-armed kneader with a steam jacket to adjust the water content to a prespecified value, and then was cooled and kneaded for 10 minutes. The obtained adulterant was processed like in Comparative Example 1 to prepare a catalyst B. Characteristics of the catalyst B is as shown in Table 4.

Example 2

Preparation of Catalyst C 1.0 Kg of aluminum adulterant, calculated as the weight of Al2O3, prepared in Comparative Example 1 and 1.0 Kg of zeolite Y with aluminum and titanium inserted therein (USY-12ACTi) prepared in Example for reference 4 were kneaded and heated in a double-armed kneader with a steam jacket to adjust the water content to a prespecified value, and then was cooled and kneaded for 10 minutes. The obtained adulterant was processed like in Comparative Example 1 to prepare a catalyst C. Characteristics of the catalyst C is as shown in Table 4.

Comparative Example 2

Preparation of Catalyst D 1.0 Kg of aluminum adulterant, calculated as the weight of Al2O3, prepared in Comparative Example 1 and 1.0 kg of zeolite Y with aluminum inserted therein (USY-12NaAlO2) prepared in Example for reference 5 were kneaded and heated in a double-armed kneader with a steam jacket to adjust the water content to a prespecified value, and then was cooled and kneaded for 10 minutes. The obtained adulterant was processed like in Comparative Example 1 to prepare catalyst D. Characteristics of the catalyst D is as shown in Table 4.

Assessment of Activity of Catalyst

Hydrocracking of DAO was performed with the catalysts A to D in a fixed bed flow reactor to measure cracking, desulfurizing, and denitrogenating activities of each catalyst. Characteristics of the DAO and reaction conditions are as shown below.

Characteristics of DAO

| Density | (g/ml) | 0.9889 |
|---|---|---|
| Sulfur content | (wt %) | 4.031 |
| Nitrogen content | (wt ppm) | 2410 |
| 375° C.+ fraction | (%) | 92.91 |
| 560° C.+ fraction | (%) | 60.61 |

Reaction Conditions

| Reaction temperature | (° C.) | 380 |
|---|---|---|
| Liquid space velocity | (hr −1) | 0.50 |
| Hydrogen/oil ratio | (Nm3/kl) | 500 |
| H2 partial pressure | (MPa) | 13 |

The product oil was set in an evaporator to measure contents of fractions boiling at a temperature of 375° C. or more (375° C.+) and those boiling at a temperature of 560° C. or more (560° C.+), and assessed reduction rate of fractions to the amount of feed oil at cracking activities of the catalysts. Assuming that the reduction rate of the fractions (375° C.+) and that of the fractions (560° C.+) are 100 in case of catalyst A (Comparative Example 1) at 380° C. respectively, relative values of reduction rates with the catalysts B to D were obtained as cracking activities of the catalysts, and the values are as shown in Table 1. Also characteristics of the product oil obtained in the reaction are as shown in Table 1.

Cracking activities of the catalyst B and catalyst C are higher than that of the catalyst A.

Cracking activity of the catalyst D is lower than that of the catalyst A. The reason is probably that a unit cell dimension of the USY-12NaAlO2 prepared in Example for reference 5 is larger than that of the USY-12 prepared in Example for reference 2 as shown in Table 3 (Characteristics of Zeolite), and therefore the USY-12NaAlO2 has lower values for the crystallinity and the specific surface area as compared to the USY-12.

TABLE 1

Assessment of Activation of Catalyst

|  |  | Catalyst A | Catalyst B | Catalyst C | Catalyst D |
|---|---|---|---|---|---|
| Cracking activity (Conv.) | | | | | |
| Conv. (375° C.+) | | 100 | 118 | 120 | 85 |
| Conv. (560° C.+) | | 100 | 112 | 114 | 81 |
| Characteristics of product oil | | | | | |
| Density | (g/ml) | 0.9188 | 0.8804 | 0.8796 | 0.9188 |
| Sulfur content | (wt %) | 0.099 | 0.014 | 0.010 | 0.099 |
| Nitrogen content | (wt ppm) | 205 | 15 | 13 | 108 |

Assessment of Characteristics of Product Oils

Tests for assessing characteristics of product oils in relation to the adaptability to catalytic cracking were performed according to the ASTM-MAT method (using a small size activity testing device) by using product oils which were fractions having the boiling point of 375° C. or higher (375° C.+) as feed oils and also using the commercially available catalyst FCC catalyst (produced by Catalysts & Chemicals Industries Co., Ltd.). Results of the testing are shown in Table 2.

TABLE 2

Assessment of Activation of Product Oil

| Evaluation test of product oil | | Product Oil of Catalyst A | Product Oil of Catalyst B | Product Oil of Catalyst C | Product Oil of Catalyst D |
|---|---|---|---|---|---|
| Conv. Rate | vol % | 73.3 | 78.9 | 79.2 | 68.4 |
| Gasoline | vol % | 53.3 | 58.2 | 59.1 | 51.1 |
| LCO | vol % | 17.7 | 14.3 | 14.8 | 20.9 |
| HCO | vol % | 9.0 | 6.8 | 6.5 | 10.7 |
| LGP | vol % | 14.2 | 16.0 | 16.5 | 12.9 |
| Coke/K | — | 1.53 | 0.94 | 0.91 | 1.58 |
| Hydrogen/K | — | 0.11 | 0.06 | 0.05 | 0.09 |

From the results of the tests, it is understood that the product oils produced with the catalysts B and C have higher conversion rates, higher gasoline yields, lower values of coke/K and hydrogen/K, and a smaller quantity of HCO fractions as compared to the product oils produced with the catalyst A or catalyst D. From the results, it is clear that the catalysts B and C, which are catalytic compositions according to the present invention, are more excellent than the catalyst A or catalyst D.

TABLE 3

Characteristics of Zeolite

| Zeolite | Unit | Ref. Ex. 1 NaY | Ref. Ex. 2 USY-12 | Ref. Ex. 3 Ti.USY-12 AC | Ref. Ex. 4 USY-12ACTi | Ref. Ex. 5 USY-12NaAlO2 |
|---|---|---|---|---|---|---|
| SiO2/Al2O3 molar ratio*1 | mol/mol | 5.06 | 16.0 | 27.8 | 29.6 | 15.8 |
| TiO2 | wt % | — | — | 3.75 | 3.82 | — |
| Crystallinity | wt % | 107 | 108 | 100 | 99 | 82 |
| UD | Å | 24.67 | 24.38 | 24.32 | 24.32 | 24.43 |
| SA | m2/g | 722 | 690 | 686 | 682 | 608 |
| 4-coord. Al | atom % | 100 | 58.8 | 97.8 | 98.1 | 72.2 |
| PVt(−600 Å) | ml/g | — | 0.51 | 0.50 | 0.63 | 0.48 |
| PVm(100-600 Å) | ml/g | — | 0.14 | 0.18 | 0.17 | 0.16 |
| PVs(35-50 Å) | ml/g | — | 0.08 | 0.04 | 0.13 | 0.14 |
| PVm/PVt | — | — | 0.27 | 0.36 | 0.35 | 0.33 |
| PVm/PVs | — | — | 3.25 | 4.50 | 3.45 | 1.14 |

*1 chemical analysis value

TABLE 4

Characteristics of Catalyst

| Catalyst | Unit | Comp. Ex. 1 | Ex. 1 | Ex. 2 | Comp. Ex. 2 |
|---|---|---|---|---|---|
| Al2O3 | wt % | 43.1 | 42.2 | 42.0 | 44.2 |
| SiO2 | wt % | 36.2 | 35.2 | 35.8 | 35.1 |
| MoO3 | wt % | 16.0 | 16.6 | 16.2 | 16.1 |
| NiO | wt % | 4.50 | 4.63 | 4.50 | 4.52 |
| TiO2 | wt % | — | 1.42 | 1.40 | — |
| SA | m2/g | 403 | 394 | 401 | 324 |
| Cr. Str. *1 | N/mm | 23.7 | 22.9 | 23.9 | 23.5 |
| ABD *2 | g/ml | 0.54 | 0.53 | 0.55 | 0.55 |
| CBD *3 | g/ml | 0.64 | 0.61 | 0.64 | 0.60 |
| PV(H2O) *4 | ml/g | 0.57 | 0.58 | 0.57 | 0.56 |

*1: Intensity of collapse
*2: Apparent bulk density
*3: Close bulk density
*4: Total pore volume

The invention claimed is:

1. A method for manufacturing a zeolite Y with aluminum and titanium inserted therein, the method comprising:

preparing an ultra-stable zeolite Y (USY) with a unit cell dimension (UD) in a range from 24.25 to 24.60 Å by ion-exchanging an NaY-type synthetic zeolite with ammonium ion followed by heating the NaY-type synthetic zeolite in steam;

processing the USY with an acidic aqueous solution containing titanium at pH 1.5 or lower followed by filtering, washing, and drying the USY to remove aluminum from a frame structure of a zeolite of the USY, thereby preparing a titanium-inserted zeolite Y having the titanium inserted to the frame structure of the zeolite; and reinserting a part of the aluminum to the frame structure of the zeolite by suspending the titanium-inserted zeolite Y in an acidic or neutral aqueous solution at 100° C. to 200° C. for 3 to 30 hours followed by filtering, washing, and drying the suspended titanium-inserted zeolite Y, thereby forming an aluminum and titanium inserted zeolite Y, wherein the aluminum and titanium inserted zeolite Y has (a) a unit cell dimension (UD) in a range from 24.25 to 24.60 Å, (b) a crystallinity of 95% or more, (c) a specific surface area (SA) of 500 m$^2$/g or more, (d) a total pore volume (PVt) of a group of pores each having a diameter of 600 Å or below in a range from 0.45 to 0.70 ml/g, (e) a pore volume (PVm) of a group of pores each having a diameter in a range from 100 to 600 Å in a range from 0.10 to 0.40 ml/g, (f) a pore volume (PVs) of a group of pores each having a diameter in a range from 35 to 50 Å in a range 0.03 to 0.15 ml/g, and (g) a percentage of 4-coordinate aluminum atoms against total aluminum atoms in the zeolite of 60 atom % or more.

2. A method for manufacturing a zeolite Y with aluminum and titanium inserted therein, the method comprising:

preparing an ultra-stable zeolite Y (USY) with a unit cell dimension (UD) in a range from 24.25 to 24.60 Å by ion-exchanging an NaY-type synthetic zeolite with ammonium ion followed by heating the NaY-type synthetic zeolite in steam;

reinserting a part of aluminum removed from a zeolite of the USY to a frame structure of the zeolite to form an aluminum-inserted zeolite Y by suspending the USY in an acidic or neutral aqueous solution at 100° C. to 200° C. for 3 to 30 hours followed by filtering, washing, and drying the USY; and processing the aluminum-inserted zeolite Y in an aqueous solution containing titanium followed by filtering, washing, and drying the solution of the aluminum-inserted zeolite Y, thereby forming an aluminum and titanium inserted zeolite Y, wherein the aluminum and titanium inserted zeolite Y has (a) a unit cell dimension (UD) in a range from 24.25 to 24.60 Å, (b) a crystallinity of 95% or more, (c) a specific surface area (SA) of 500 m$^2$/g or more, (d) a total pore volume (PVt) of a group of pores each having a diameter of 600 Å or below in a range from 0.45 to 0.70 ml/g, (e) a pore volume (PVm) of a group of pores each having a diameter in a range from 100 to 600 Å in a range from 0.10 to 0.40 ml/g, (f) a pore volume (PVs) of a group of pores each having a diameter in a range from 35 to 50 Å in a range 0.03 to 0.15 ml/g, and (g) a percentage of 4-coordinate aluminum atoms against total aluminum atoms in the zeolite of 60 atom % or more.

3. The method according to claim 1, wherein the aluminum and titanium inserted zeolite Y has (h) a ratio of a pore volume (PVm) of a group of pores each having a diameter in a range from 100 to 600 Å, to a total pore volume (PVt) of a group of pores each having a diameter of 600 Å or less is 0.30 or more, and (i) a ratio of the pore volume (PVm) of the group of pores each having the diameter in the range from 100 to 600 Å, to a pore volume (PVs) of a group of pores each having a diameter in a range from 35 to 50 Å is 2.5 or more.

4. The method according to claim 2, wherein the aluminum and titanium inserted zeolite Y has (h) a ratio of a pore volume (PVm) of a group of pores each having a diameter in a range from 100 to 600 Å, to a total pore volume (PVt) of a group of pores each having a diameter of 600 Å or less is 0.30 or more, and (i) a ratio of the pore volume (PVm) of the group of pores each having the diameter in the range from 100 to 600 Å, to a pore volume (PVs) of a group of pores each having a diameter in a range from 35 to 50 Å is 2.5 or more.

5. A method for manufacturing a catalytic composition for hydrotreating of hydrocarbon, the method comprising:

carrying a metal component for hydrogenation onto a carrier comprising a porous inorganic oxide and the aluminum and titanium inserted zeolite Y according to claim 1.

6. A method for manufacturing a catalytic composition for hydrotreating of hydrocarbon, the method comprising:

carrying a metal component for hydrogenation onto a carrier comprising a porous inorganic oxide and the aluminum and titanium inserted zeolite Y according to claim 2.

7. A method for manufacturing a catalytic composition for hydrotreating of hydrocarbon, the method comprising:

carrying a metal component for hydrogenation onto a carrier comprising a porous inorganic oxide and the aluminum and titanium inserted zeolite Y according to claim 3.

8. A method for manufacturing a catalytic composition for hydrotreating of hydrocarbon, the method comprising:

carrying a metal component for hydrogenation onto a carrier comprising a porous inorganic oxide and the aluminum and titanium inserted zeolite Y according to claim 4.

* * * * *